United States Patent [19]

Koizumi et al.

[11] 4,118,117
[45] Oct. 3, 1978

[54] ELECTROPHOTOGRAPHIC OPTICAL SCANNING SYSTEM

[75] Inventors: Yutaka Koizumi; Kenji Hashimoto, both of Tokyo, Japan

[73] Assignee: Ricoh Company, Ltd., Tokyo, Japan

[21] Appl. No.: 675,847

[22] Filed: Apr. 12, 1976

[30] Foreign Application Priority Data

Apr. 15, 1975 [JP] Japan .................................. 50-45555

[51] Int. Cl.$^2$ ............................................. G03G 15/28
[52] U.S. Cl. ......................................... 355/8; 355/11
[58] Field of Search .................. 355/8, 11, 14, 81, 51, 355/65, 66, 84, 67

[56] References Cited

U.S. PATENT DOCUMENTS

| 3,380,339 | 4/1968 | Moss | 355/51 |
| 3,614,222 | 10/1971 | Post | 355/8 |
| 3,704,944 | 12/1972 | Komori et al. | 355/8 |
| 3,836,245 | 9/1974 | Hastwell et al. | 355/14 |
| 3,918,805 | 11/1975 | Limberger et al. | 355/8 |

Primary Examiner—L. T. Hix
Assistant Examiner—W. J. Brady
Attorney, Agent, or Firm—Frank J. Jordan

[57] ABSTRACT

A scanning head moves relative to a document platen and a photoconductive member for scanning a document supported on the platen and imaging the photoconductive member. The scanning head has a slit which constitutes an exposure aperture and has a width which is predetermined for optimum image formation. The speed of movement of the scanning head is varied to adjust the image intensity to the desired value depending on the characteristics of the document. The scanning head is connected to a belt which is trained around pulleys in such a manner that driving the belt in one direction produces reciprocation of the scanning head, the scanning head being driven in one direction for one scanning operation and in the opposite direction for a subsequent scanning operation.

4 Claims, 5 Drawing Figures

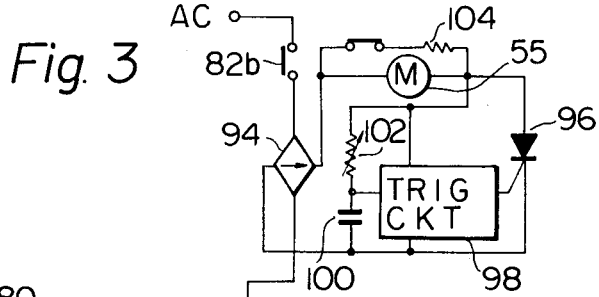
Fig. 3
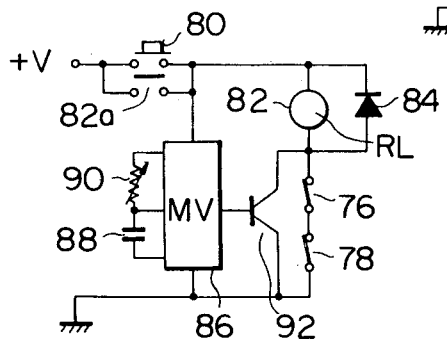
Fig. 4
Fig. 5
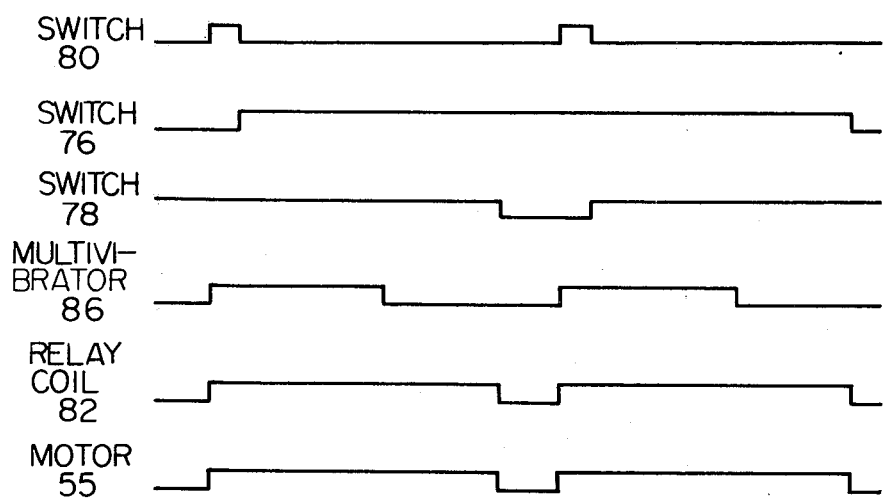

ELECTROPHOTOGRAPHIC OPTICAL SCANNING SYSTEM

BACKGROUND OF THE INVENTION

The present invention relates to an optical scanning system for electrostatic photography.

Optical scanning systems for electrostatic photography are known in the art in which at least one of a document platen, a scanning ahead and a photoconductive member is moved to accomplish scanning of a document on the platen and imaging of the photoconductive member. The imaging system is provided with a slit which serves as an exposure aperture.

It is desirable to be able to vary the intensity of the light image incident on the photoconductive member in accordance with the characteristics of the particular original document for electrostatic reproduction. Prior art systems generally vary the width of the slit to accomplish this result. However, various drawbacks are inherent in such a method. Due to the configuration of light sources and optical elements of the scanning system, the intensity of the image along the length of the slit becomes non-uniform at various widths of the slit, with the pattern of non-uniformity changing in dependence on the slit width. The slit width must be small in order to produce a sharp image. An imaging system in which the slit width is reduced below a maximum value to control the image intensity is inherently wasteful of the light illuminating the document. Generally, there is an optimum value of slit width which provides an image of maximum quality, and any substantial change from this value causes a noticeable degradation of the image.

Another drawback in known imaging systems is that the scanning head is moved in one direction to effect scanning and then returned to its original position. The return movement of the scanning is therefore non-productive constituting inherent inefficiency in the system which necessitates excessives copying time.

SUMMARY OF THE INVENTION

It is therefore an object of the present invention to provide an optical scanning system for electrophotography which overcomes the drawbacks of the prior art by varying the speed of relative movement between a scanning head and an original document to adjust the intensity of the image projected on a photoconductive member to a desired value.

It is an other object of the present invention to provide an optical scanning system in which a scanning head effects one imaging operation during movement from a first position to a second position and a subsequent imaging operation while returning from the second position to the first position.

It is another object of the present invention to provide an optical scanning system in which a belt or chain driven in one direction produces reciprocation of a scanning head.

Other objects, together with the foregoing, are attained in the embodiment described in the following description and illustrated in the accompanying drawings.

BRIEF DESCRIPTION OF THE DRAWING

FIG. 3 is an electrical schematic diagram of a motor speed control circuit of an optical scanning system embodying the present invention;

FIG. 4 is an electrical schematic diagram of a switch timing circuit of an optical scanning system embodying the present invention; and FIG. 5 is a timing chart illustrating the operation of the scanning system.

DESCRIPTION OF THE PREFERRED EMBODIMENTS

While the optical scanning system of the invention is susceptible of numerous physical embodiments, depending upon the environment and requirements of use, substantial numbers of the herein shown and described embodiments have been made, tested and used, and all have performed in an eminently satisfactory manner.

Figure 1:
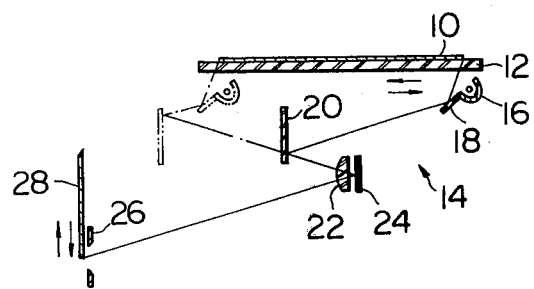
FIG. 1 is a schematic view of a first type of optical scanning system to which the present invention relates.

The optical scanning system of the present invention provides scanning of a original document by means of relative movement between a scanning head and the document. A photoconductive member onto which an image of the document is formed by the scanning head may also be moved. Either the scanning head or the document may be fixed while the other moves or both may move. In FIG. 1, various members of an optical scanning head and a photoconductive member move while a document is held in a fixed position. Specifically, an original document 10 for electrostatic reproduction is placed face down on a transparent platen 12. An optical scanning head 14 comprises a light source 16 integral with a plane mirror 18 which is movable below and parallel to the platen 12 between a solid line position and a phantom line position as shown by arrows. Another plane mirror 20 is movable parallel to the plane mirror 18 between a solid line position and a phantom line position in synchronism with and at half the speed of the mirror 18. A converging lens 22 and a plane mirror 24 are fixed in position facing a slit 26 which serves as an exposure aperture extending perpendicular to the direction of movement of the mirrors 18 and 20. A photoconductive plate or sheet 28 is movable relative to the slit 26 in synchronism with the mirrors 18 and 20.

In operation, the mirrors 18 and 20 are moved leftwardly from their solid line positions to their phantom line positions and the photoconductive sheet 28 is moved downwardly in synchronism therewith. An optical image of the portion of the document 10 directly above the mirror 18 which is illuminated by the light source 16 is reflected from the plane mirror 18 to the plane mirror 20, from the plane mirror 20 through the lens 22 to the plane mirror 24, and from the plane mirror 24 through the lens 22 and slit 26 onto the photoconductive sheet 28. For a subsequent scanning operation the directions of movement of the mirrors 18 and 20 and photoconductive sheet 28 are reversed.

The width of the slit 26 is selected for optimum image quality as discussed above. The mirrors 18 and 20 and sheet 28 are driven by a motor of the variable speed type so that the scanning speed of the system is thereby variable. Increasing the scanning speed decreases the intensity of the image incident on the sheet 28 and decreasing the scanning speed increases the intensity of the image. Such a motor and control circuit for the motor which may be used with the system of FIG. 1 are described below with reference to FIGS. 2 to 5.

Figure 2:
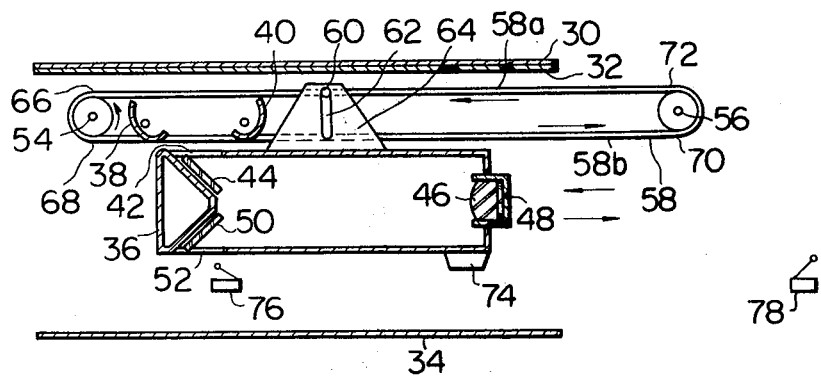
FIG. 2 is a schematic view of a second type of optical scanning system to which the present invention relates.

In FIG. 2, an original document 30 is placed face down on a transparent platen 32. A photoconductive sheet 34 is placed face up below and parallel to the platen 32. In this system, both the document 30 and sheet 34 are held stationary and a scanning head 36 reciprocates therebetween. The scanning head 36 comprises light sources 38 and 40 to illuminate the document 30. A first slit 42 is formed through the scanning head 36 between the light sources 38 and 40. A plane mirror 44 is disposed below the slit 42 at an angle of approximately 45° with the horizontal. The mirror 44 is arranged to reflect an image of the portion of the document 30 directly above the slit 42 through a converging lens 46 onto a plane mirror 48 arranged behind the lens 46. The mirror 48 reflects the image through the lens 46 onto a plane mirror 50 disposed at approximately 45° with the horizontal. The mirror 50 reflects the image through a second slit 52 onto the sheet 34.

A drive pulley 54 is driven by a motor 55 which is shown in FIG. 3 counterclockwise in FIG. 2. An idler pulley 56 is provided which has an axis parallel to the pulley 54. A belt 58 is trained around the pulleys 54 and 56 in such a manner that the pulleys 54 and 56 and belt 58 all rotate counterclockwise.

A pin 60 is fixed to the belt 58 which slidably engages in a vertical slot 62 formed through a flange member 64 which is fixed to the scanning head 36.

The belt 58 defines an upper run 58a and a lower run 58b which move leftwardly and rightwardly respectively as shown in FIG. 2. In the position shown in FIG. 2, the pin 60 is on the upper run 58a of the belt 58 and is moved leftwardly toward the pulley 54. The pin 60 engages with an upper end of the slot 62 thereby moving the scanning head 36 leftwardly. When the pin 60 reaches a position 66 it is just about to move around the drive pulley 54. As the pin 60 moves around the pulley 54 to a position 68, it reverses direction and begins to move rightwardly with the lower run 58b of the belt 58. The pin 60 engages with a lower end of the lot 62 and moves together with the scanning head 36 rightwardly to a position 70 where the pin 60 is just about to move around the idler pulley 56. As the pin moves around the idler pulley 56, it reverses direction and at a position 72 moves leftwardly with the upper run 58a of the belt 58. It will thereby be seen that continuous movement of the belt 58. It will thereby be seen that continuous movement of the belt 58 in one direction produces reciprocation of the scanning head 36. The pulleys 54 and 56 and belt 58 may of course be replaced by sprockets and a chain (not shown) which operate in the same manner.

A cam plate 74 is fixed to the bottom of the scanning head 36 which is arranged to engage with and open a normally closed switch 76 when the pin 60 is between the positions 66 and 68. The cam plate 74 is further arranged to open a normally closed switch 78 when the pin 60 is between the positions 70 and 72.

A control circuit for the motor 55 is shown in FIGS. 3 and 4. A normally open print switch 80 is connected in series with a relay coil 82 and the switches 76 and 78 between a direct current voltage source +V and ground. Normally open relay contacts 82a actuated by the relay coil 82 are connected in parallel with the print switch 80 and a diode 84 is connected in parallel with the relay coil 82. A monostable multivibrator 86 is connected between the junction of the print switch 80 and the relay coil 82 and ground. The pulse duration of the multivibrator 86 is determined by a timing capacitor 88 and a variable resistor 90. The output of the multivibrator 86 is connected to the base of an NPN transistor 92, the emitter of which is grounded. The collector of the transistor 92 is connected to the junction of the relay coil 82 and the switch 76.

Normally open contacts 82b actuated by the relay coil 82 are connected in series with a full wave rectifier 94 between an alternating current source AC and ground. The motor 55 is connected in series with the anode-cathode circuit of a silicon controlled rectifier 96 between the outputs of the rectifier 94. A trigger circuit 98 is connected in parallel with the anode-cathode circuit of the silicon controlled rectifier 96 and has an output connected to the gate of the rectifier 96. A capacitor 100 and a variable resistor 102 which is ganged together with the resistor 90 are connected to the trigger circuit 98. Normally closed contacts 82c actuated by the relay coil 82 are connected in series with a resistor 104 across the motor 55.

The trigger circuit 98 is well known in the art and is not shown in detail. The trigger circuit 98 serves to adjustably vary the speed of the motor 55 by causing the silicon controlled rectifier 96 to fire at different points on the output voltage waveform of the rectifier 94. If the trigger circuit 98 triggers the rectifier 96 at a low voltage, the motor 55 will be driven during most of the output waveform of the rectifier 94. Increasing the trigger voltage causes the rectifier 96 to be triggered later in the output waveform of the rectifier 94 and the motor 55 will be driven during a shorter portion of the output waveform of the rectifier 94 and therefore at a lower speed.

The operation of the system will now be described, assuming that the pin 60 is initially at the position 66 and the motor 55 is de-energized. The switch 76 is opened by the cam plate 74 thereby disconnecting the relay coil 82 from ground. The contacts 82a, 82b and 82c are open, open and closed respectively. The open contact 82b disconnects the rectifier 94 from the source AC to de-energize the motor 55. The open contacts 82a disconnect the multivibrator 86 and relay coil 82 from the source +V. To initiate a scanning operation, the system operator momentarily closes the print swtich 80. The open and closed conditions of the swtiches 76, 78 and 80, the output of the multivibrator 86 and the energization of the relay coil 82 and motor 55 are schematically illustrated in FIG. 5. Closing of the switch 80 triggers the multivibrator 86 which produces a high output to turn on the transistor 92. The transistor 92 provides a low resistance path to ground for the relay coil 82 so that the relay coil 82 is energized. This causes the contacts 82a, 82b and 92c to close, close and open respectively. Closing of the contacts 82a enables the relay coil 82 to remain energized after the switch 80 is opened. Closing of the contacts 82b applies power to the rectifier 94 to energize the motor 55. The motor 55 drives the belt 58 so that the pin 60 moves around the pulley 54 to a position rightward of the position 68 so that the cam plate 74 disengages from the switch 76 allowing the switch 76 to close. The duration of the high output of the multivibrator 86 is sufficient to allow the pin 60 to move from the position 66 past the position 68 or from the position 70 past the position 72 in accordance with the speed of the motor 55 which corresponds to the positions of the variable resistors 90 and 102.

As the pin 60 passes the position 68, the switch 76 closes thereby establishing an alternate path to ground for the relay coil 82. Subsequently the output of the multivibrator 86 goes low turning off the transistor 92 but the relay coil 82 remains energized through the switches 76 and 78. The pin 60 and scanning head 36 move rightwardly until the cam plate 74 engages with and opens the switch 78. This de-energizes the relay coil 82 so that the holding contacts 82a open. The contacts 82b open thereby de-energizing the motor 55. The contacts 82c close thereby connecting the resistor 104 in series with the motor 55. Any further movement of the motor 55 due to inertia causes current flow through the resistor 104 due to the counter-electromotive force developed by the motor 55 so as to drive the motor 55 in the opposite direction, the magnitude of the current being proportional to the speed of the motor 55. The resistor 104 thereby serves to brake the motor 55 to a halt.

When the print switch 80 is closd again, the multivibrator 86 will again be triggered to energize the motor 55 to drive the pin 60 from the position 70 past the position 72. The switch 78 will then close so that the scanning head 36 will be driven leftwardly to the position 66. It will thus be understood that successive closures of the print switch 80 cause the scanning head 36 to move alternatingly leftward and rightward for successive scanning operations. This is a major improvement over prior art systems in which one-half of a reciprocation of a scanning head is wasted. The system shown in FIG. 1 may of course be driven by the motor 55 in combination with the circuit of FIGS. 3 and 4 and the pulleys 54 and 56 and belt 58. However, within the scope of the present invention either of the systems of FIGS. 1 and 2 may be driven in any manner in which the intensity of the image is varied by adjustably varying the scanning speed.

What is claimed is:

1. An optical scanning system for electrophotographic copying apparatus having a photoconductive member comprising, in combination:
    a fixed platen on which a document is placed for electrostatic reproduction;
    optical scanning means having an exposure aperture for optimum image formation, said aperture being a slit which has a fixed predetermined size, said scanning means comprising a light source integral with an imaging means through which a light image is incident on the photoconductive member;
    drive means operative to reciprocatingly move the scanning means relative to the fixed platen and the stationary photoconductive member in one direction for one scanning and in the opposite direction for a subsequent scanning, said slit extending in a direction perpendicular to said directions, said drive means comprising a drive motor, a drive pulley connected to the motor, a idler pulley, and a belt trained around the drive and idler pulleys and connected to the scanning meas;
    the scanning means comprising a member formed with a slot extending perpendicular to the runs of the belt, the scanning means further comprising a pin fixed to the belt and slidably engaging in the slot; and
    control means for adjustably varying the speed of the drive motor and adjustably varying the speed of the reciprocative movement of the scanning means to thereby adjust the intensity of the light image incident on the photoconductive member depending on the characteristics of the document for electrostatic reproduction, the control means comprising switch means to initially energize the motor and de-energize the motor when the scanning means reaches first and second predetermined positions after movement in said one direction and said opposite direction, the first and second predetermined positions being such that the pin is just about to move around the drive and idler pulleys respectively.

2. A scanning system as in claim 1, in which the switch means comprises first and second switches which are engagably actuated by the scanning means when the scanning means is in the first and second positions respectively, the control means further comprising timer means operative to initially energize the motor for a length of time sufficient for the pin to move around the drive pulley.

3. A scanning system as in claim 2, in which the timer means is operative to adjustably vary the length of time for which the motor is initially energized in accordance with the speed of the motor.

4. A scanning system as in claim 3, in which the timer means comprises a monostable multivibrator.

* * * * *